Oct. 10, 1961 R. L. PEACOCK 3,003,545
TIRE-TRUING MACHINE
Filed Oct. 8, 1959 3 Sheets-Sheet 1

INVENTOR.
Roy L. Peacock
BY
atty.

Oct. 10, 1961    R. L. PEACOCK    3,003,545
TIRE-TRUING MACHINE
Filed Oct. 8, 1959    3 Sheets-Sheet 2
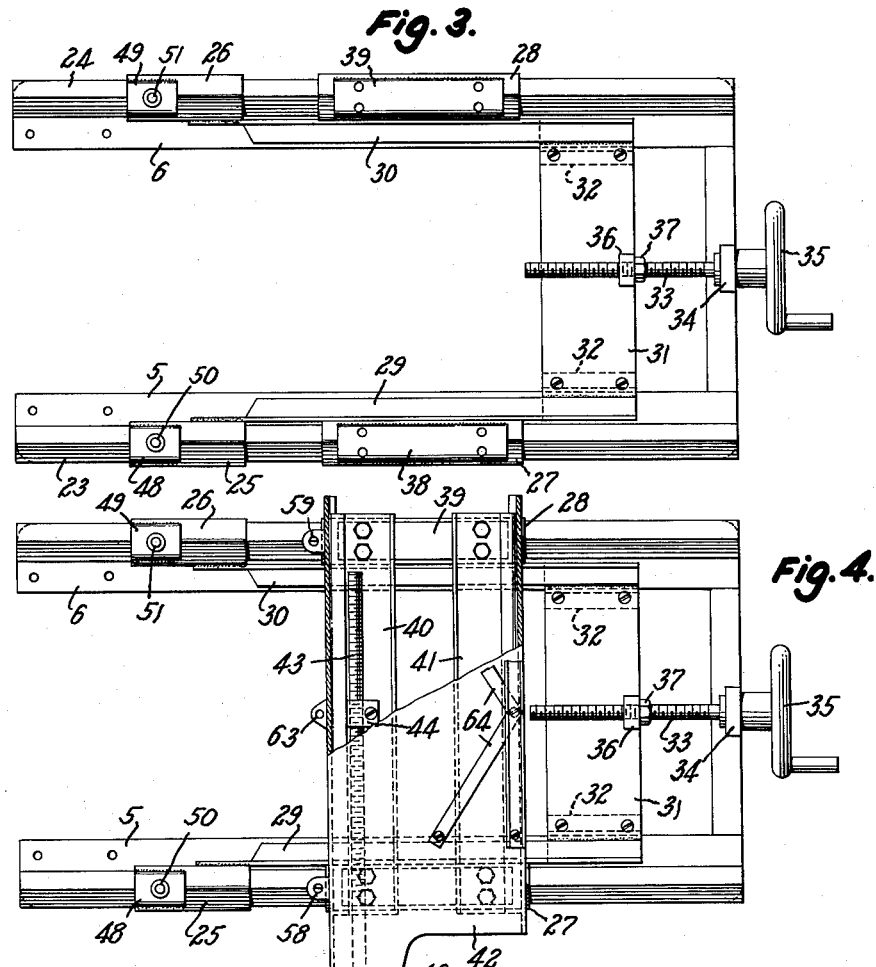
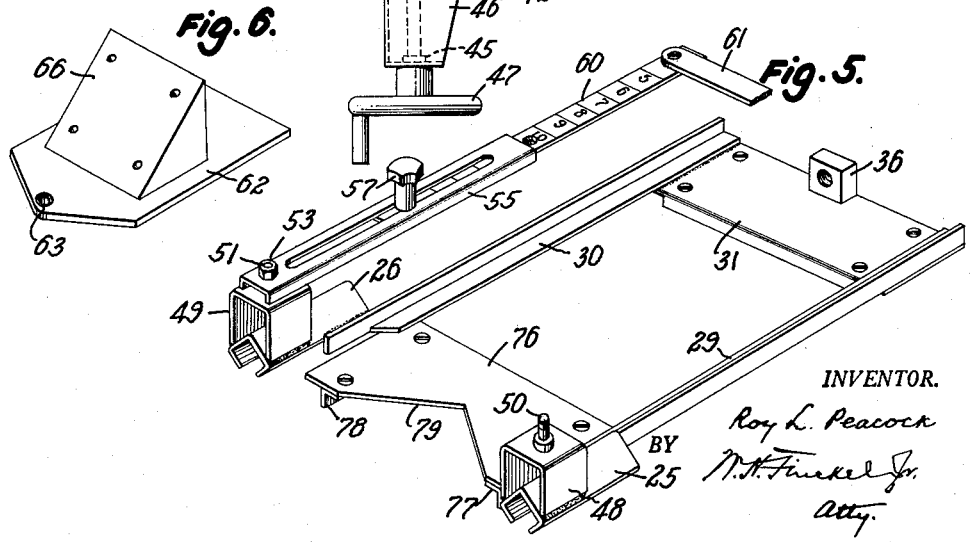
INVENTOR.
Roy L. Peacock
BY
M. H. Finckel Jr.
Atty.

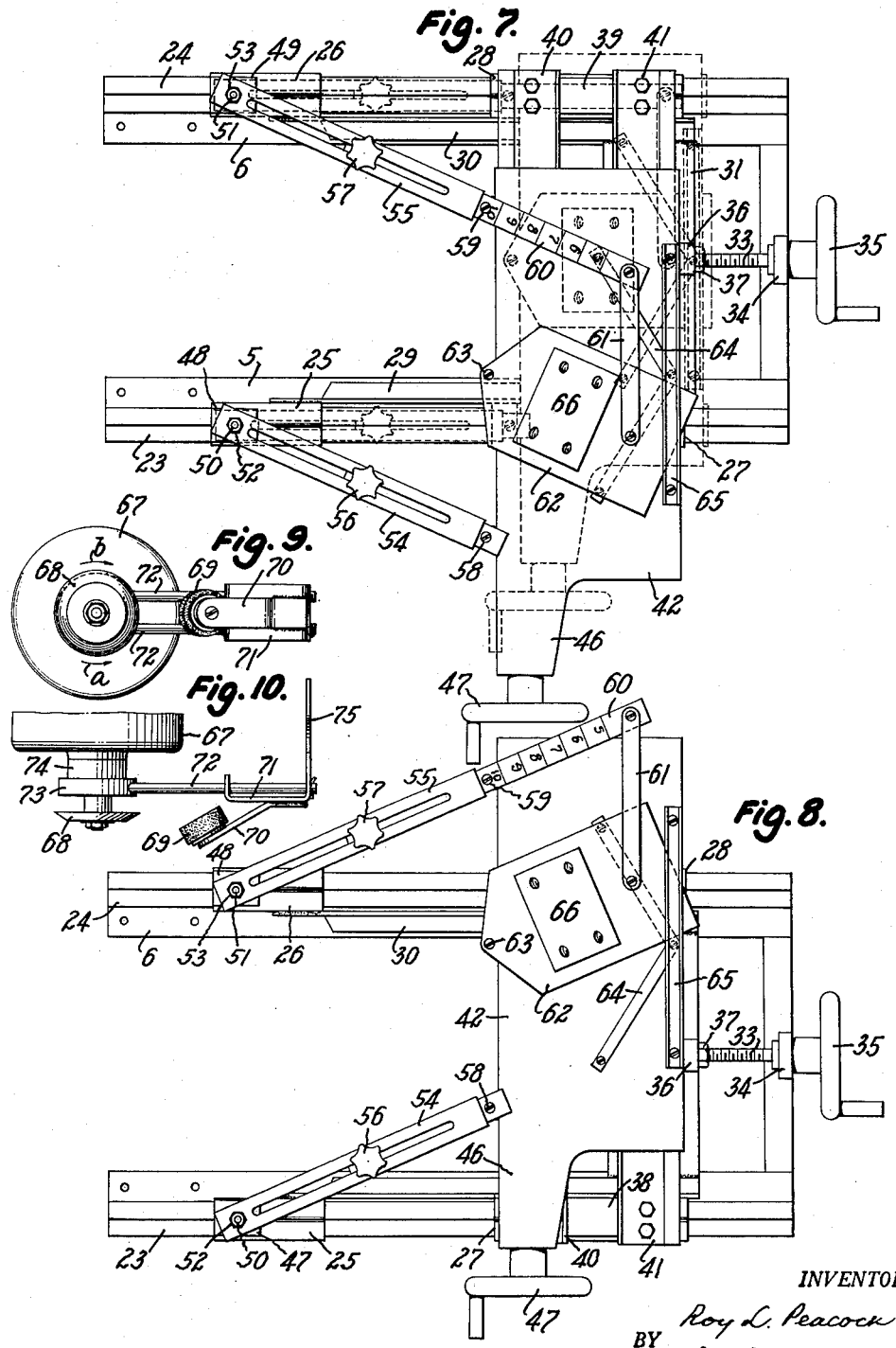

United States Patent Office 3,003,545
Patented Oct. 10, 1961

3,003,545
TIRE-TRUING MACHINE
Roy L. Peacock, Highway 280 E., Americus, Ga.
Filed Oct. 8, 1959, Ser. No. 845,258
7 Claims. (Cl. 157—13)

This invention relates to a tire-truing machine, and it embodies modifications and refinements of the machine covered by my copending application for patent for Tire Truing Machine, Serial No. 712,228, filed January 30, 1958, which matured into Patent Number 2,966,011 issued on December 27, 1960.

One object of the invention is to provide a tire-truing machine of the general type of that disclosed in my application above referred to, but embodying refinements whereby operation of the machine may, in some respects, be automatic.

Another object of the invention, having such automatic operation in mind, is to provide means whereby, when the tire-truing tool is traversed over the periphery of a tire, the tool will be automatically advanced and retracted in a lateral arc substantially conforming to the lateral contour of the periphery of the tire tread.

A further object, having reference to that last stated, is to provide means whereby, during such lateral travel of the tool, the tool itself will be automatically adjusted to properly present its operative truing edge or surface in contact with the lateral, normally curved, contour of the periphery of the tire.

Another object is to provide means for accommodating the traversing path, and positioning, of the truing tool to tires having tread peripheries of various lateral curvatures.

Still another object is to provide means for insuring proper adjustment of the tire on the machine relative to the truing tool preliminary to the truing operation.

Another object is to provide as the truing tool a rotary, motor-driven, disc-like cutting knife the cutting edge of which is traversed across the tire periphery as the tire is rotated, and to furnish means for sharpening such knife while the machine is in operation, or at least while the knife is rotatively driven.

With these and other objects in view, as will be apparent from the following description, the invention comprises a tire-truing machine having a supporting frame, provided with a throat into which a tire may have a portion of its periphery extend, means for rotatively mounting, and imparting rotation to the tire while thus positioned, a platform mounted on said frame for sliding movement longitudinally thereof toward and away from the periphery of the mounted tire, a table carried by the platform and movable thereon transversely of the supporting frame and hence transversely of the periphery of the tire, a tire-truing tool carried by the table, and radius rod means pivotally connected with the table and with relatively fixed means carried on the supporting frame for moving said table and its carried tool in a predetermined arc toward and away from the tire periphery, and hence longitudinally of the frame, as the table is moved laterally thereof, the said radius rod means being adjustable in effective length to accommodate said arc to the lateral curvature of the tire periphery, and the truing tool preferably being mounted for angular shifting movement upon the table and having a connection with said radius rod means serving to angularly adjust it in consonance with the arcuate traverse of the table; and the invention includes, also, sharpening means for the truing tool mounted for movement into and out of sharpening engagement therewith, all as will be explained more particularly hereinafter and finally claimed.

In the accompanying drawings illustrating the invention, in the several figures of which like parts are similarly designated, FIG. 1 is a side elevation of the machine of the invention, with the near radius rod broken away to show rearwardly disposed parts.

FIG. 3 is a top plan view of the supporting frame of the machine showing the mounting of certain operative elements thereon and with other overlying elements removed, FIG. 4 is a view similar to FIG. 3 but showing additional operative elements, with certain of same displaced somewhat and partially broken away and in section to reveal underlying parts.

Figure 2:
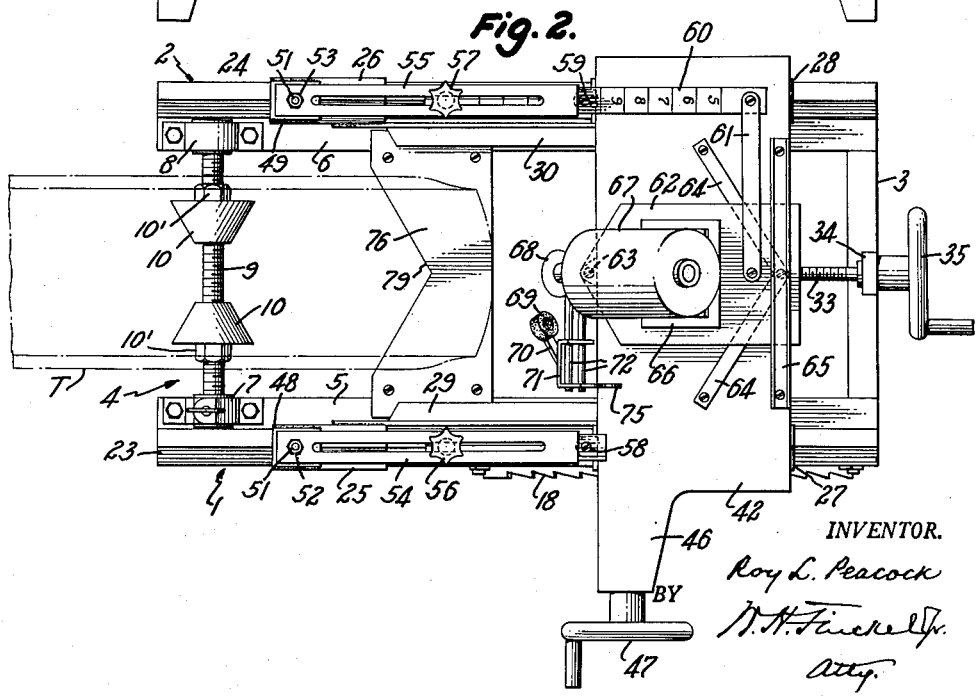
FIG. 2 is a top plan view thereof.

FIG. 5 is a perspective view of the traveller plate and its connected guide followers with a radius rod connected to one of same, and showing also the slidable gage plate, FIG. 6 is a perspective view of the truing-tool and motor carrying base, FIGS. 7 and 8 are plan views similar to FIG. 2, with parts omitted in the interest of simplicity of disclosure, showing the two maximum opposite limits of lateral movement, and consequent longitudinal movement, of the tool-carrying table; FIG. 7 showing, in broken lines, also the medial position thereof as depicted in FIG. 2, and FIGS. 9 and 10 are, respectively, a front end, or axial, view, and a top plan view, of the tool-sharpening means and the adjustable mounting therefor.

In the embodiment of the invention shown in the drawings, the machine includes a supporting frame having a pair of similar, preferably panelled, sides 1 and 2, a preferably panelled rear end 3, and an open-throated front end 4.

Figure 1:
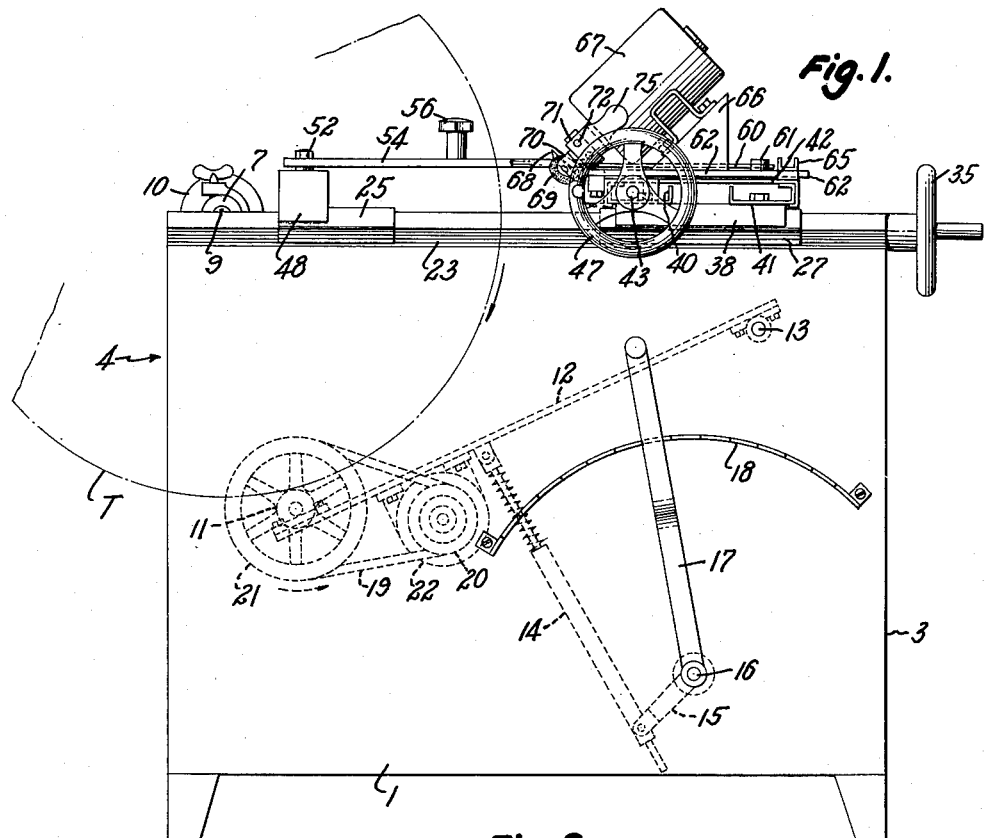

The upper edges of the sides 1 and 2 are provided with similar opposed, inwardly extending flanges 5 and 6, respectively, upon which elements of the tire-truing mechanism are supported, including bearings 7 and 8 in which are rotatably journalled the ends of a screwthreaded supporting mandrel 9 carrying a pair of axially adjustable cone members, or adapters 10, provided with jam nuts 10' (FIGS. 1 and 2), between which a wheel, or other tire mount (not shown) may be secured for rotation with the mandrel 9 by engagement with the periphery of the mounted tire T of a roller 11 carried by a beam 12 pivoted at 13 in the frame sides 1 and 2, this roller being resiliently pressed into driving contact with the tire periphery by spring-biased telescoping link means 14 actuated through a lever arm 15 pivoted at 16 and under the control of a hand lever 17 which may be locked in required position, depending upon the radius of the tire, by a notched sector 18. Rotative drive is imparted to the roller 11 through belt and pulley drive means 19, 20, 21, from an electric motor 22 attached to the beam 12, all as shown in FIG. 1.

Extending longitudinally of, and affixed to, the side flanges 5 and 6, respectively, and in relative parallelism are similar guide bars 23 and 24 carrying longitudinally slidable front, or first, guide followers 25 and 26 and similarly slidable rear, or second, guide followers 27 and 28, respectively. The front guide followers 25 and 26 are rigidly connected by rearwardly extending arm members 29 and 30 with a traveller plate 31 (FIGS. 3, 4 and 5) suidably guided by guide members 32 and bearing upon the flanges 5 and 6 of the frame. Adjustment of the traveller plate 31, and with it of the front guide followers 25 and 26, longitudinally of the supporting frame is effected by an adjusting screw 33, mounted at 34 at the rear of the frame, operated by a hand wheel 35 and screwthreadedly engaged with a lug 36 fixed to the traveller plate 31, a jam nut 37 preferably being provided to hold the parts in desired adjusted position longitudinally of the frame.

Rigidly attached to and spanning the rear guide followers 27 and 28, and supported slightly thereabove by saddle members 38 and 39, respectively, are longitudinally spaced, parallel, box-like guide rails 40 and 41 (FIGS. 1, 3, 4, 7 and 8) to provide a platform upon which is mounted, for transverse sliding movement, a table 42 to which such sliding movement can be imparted by a transverse feed screw 43 lying within the confines of the guide rail 40 and engaging a screwthreaded lug 44 affixed to said rail. The outwardly extending end of the feed screw 43 is anchored at 45 in an offstanding extension 46 of the table 42 and is provided with a hand wheel 47.

The front guide followers 25 and 26 are provided with saddle members 48 and 49, respectively, carrying pivot pintles 50 and 51 to which are pivotally secured, by nuts 52 and 53, the forward ends of radius rods 54 and 55 both of which comprise pairs of telescoping members for adjusting their effective radial extent and clamping screws 56 and 57, respectively, for maintaining their similar fixed adjustment. The rear ends of these radius rods are pivotally connected at 58 and 59, respectively (FIGS. 2, 7 and 8) with the table 42, and one of them, 55 as shown, has a graduated rearward extension 60 pivotally connected by a link 61 with a tool-carrying base member 62 preferably pivoted at 63 for shifting movement on the table 42 and supported out of frictional contact therewith by a track 64. Upward tilting of the rear end of the base member 62 is prevented by a hold-down rail 65 having its ends secured in spaced relation to the table 42.

The base member 62 carries a motor mounting boss 66 having a slanting front face to which is secured the tool carrying and driving motor 67, and the angle of this slanting face is such as to position the axis of the motor shaft and hence the tool, preferably a disc-like cutting knife 68 (FIGS. 1, 2, 9 and 10), at the proper angle for most effective cutting, truing action relative to the periphery of the tire T.

For sharpening the knife 68 there is provided an abrasive member 69 (FIGS. 1, 2, 9 and 10) mounted at the proper angle for engagement with the chamfered knife edge upon an arm 70 carried by a traveller 71 slidable normal to the axis of the knife upon slide bars 72 carried by a collar 73 affixed to the hub 74 of the motor 67. The traveller 71 is preferably provided with an operating handle 75 by which it may readily be moved axially of the bars 72 to shift the abrasive member 69 into sharpening contact with the edge of the knife 68 and to withdraw it therefrom.

A centering gage plate 76 (FIGS. 2 and 5) is slidable longitudinally of the frame upon the flanges 5 and 6 and is properly guided thereon in its longitudinal movement by guide members 77 and 78 which engage the opposed inner edges of the flanges. The gage plate is provided in its forward edge with a V notch 79 which is exactly centered upon the medial longitudinal axis of the frame. It will be noted, particularly by reference to FIG. 5, that this gage plate is freely slidable longitudinally of the flanges 5 and 6 beneath the arm members 29 and 30.

The graduations of the extension 60 of the radius rod 55 have arbitrary values corresponding with indicia borne by a set of individual templets (not shown), the edges of which are curved in conformity with the lateral curvature of the peripheries, or treads, of standard tires. Thus, by determining such tread curvature of a tire to be trued by selecting a templet complemental to such curvature, and adjusting the radius rods 54 and 55 in agreement with the indicia of such templet by reference to the appropriate graduation on the extension 60, the table 42, during its travel transversely of the frame, will traverse an arc of a radius proper to advance and retract the tool 68 in proper truing, cutting, engagement laterally of the tire periphery. Furthermore, the linkage 61 between the rearward extremity of the extension 60 and the tool-carrying base 62 will function, during such movement of the table 42, to properly, progressively adjust the axis of the tool with respect to the tire periphery. As shown in FIGS. 2, 7 and 8, the radius rods are adjusted to the length defined by the graduation "11" which is aligned with the end of the outer telescoping element of the radius rod 55.

In the operation of the machine the following steps are preferably followed for best results.

First, the mandrel 9 is removed from its bearings 7 and 8, the bearing 7 having a releasable holder for this purpose, as shown in FIGS. 1 and 2, and the tire mount or wheel, with a tire, is slipped onto the mandrel, a cone 10 with its jam nut 10' being positioned at each side of such mount. Then the mandrel is replaced in its bearings and secured.

Next, in order to check the tire for warp or wobble, a piece of chalk is held against its side near the edge of the tread and the tire is rotated slowly. If a high spot is found it is marked and the tire is turned to bring the mark at top or bottom to adjust the tire for proper centering in the throat 4.

Now, by sliding the gage plate 76 toward the tire, and adjusting the cones 10 axially of the mandrel 9 until the tire periphery is exactly centered in the V notch of such plate the tire will be properly centered in the throat and the cones 10 are then secured by their jam nuts 10'.

Then the lateral curvature of the tire tread, or periphery is determined by application of an appropriately curved templet and the radius rods 54 and 55 are adjusted to the proper length by reference of the indicia of the chosen templet to a graduation of the extension 60, the clamping screws 56 and 57 thereafter being tightened.

Now, with the table in its median position (FIG. 2 and broken lines FIG. 7), the tire is rotated slowly and, while advancing the table toward the tire by operation of the hand wheel 35, the gap between the periphery of the tire and the edge of the knife 68 is watched and when the highest spot on the periphery comes opposite the knife edge the table is advanced until the knife edge is in contact with such spot.

Then the hand lever 17 is operated to move the drive roller 11 into contact with the tire, the hand wheel 47 is rotated to move the table 42 to its extreme position toward the operator, as shown in full lines in FIG. 7, the motor 22 is energized to drive the roller 11 and rotate the tire in the direction of the arrow, FIG. 1, and the motor 67 is energized through a reversing switch, not shown, to drive the truing knife 68 in the direction of the arrow $a$, FIG. 9. With both the tire and the knife thus driven, the table is traversed in the arcuate path hereinbefore described to traverse the knife across the tire periphery (FIG. 8), the knife meanwhile being appropriately laterally, arcuately, shifted automatically by the link 61. Of course, the table is moved longitudinally by operation of the hand wheel 35, as cutting begins, to determine the proper depth of cut, preferably not greater than 1/8 inch.

After completion of this first pass the knife motor 67, is stopped and then reversed to drive the knife in the direction of the arrow $b$, FIG. 9, and the table is traversed back to the starting point.

Traverse of the knife across the periphery of the tire may be repeated in this manner as often as necessary to properly true the tire, and the knife will be advanced as much as appears to be necessary for successive cuts by operation of the hand wheel 35, the finishing cuts preferably being thin and serving to remove any "feathers" which might otherwise remain.

As hereinbefore indicated, the knife 68 may be sharpened during operation of the machine by manually advancing the abrasive member 69 into grinding contact with its cutting edge portion.

Various changes and modifications are considered to be within the principle of the invention and the scope of the following claims.

What I claim is:

1. A tire-truing machine, comprising a supporting frame, means carried adjacent to one end of said frame for axially rotatably supporting a tire, means for rotating said tire on its axis, guide bar means supported by said frame and extending longitudinally thereof, first guide follower means mounted on said guide bar means adjacent to said tire supporting means, traveller means mounted on said frame in longitudinally spaced relation thereon with respect to said tire supporting means and rigidly connected with said first guide follower means, means for adjusting said traveller means and with it said first guide follower means longitudinally of said frame and for maintaining such adjustment, second guide follower means mounted on said guide bar means and freely slidable thereon longitudinally of said frame, means defining a platform carried by said second guide follower means and extending transversely of said frame, a table carried by said platform and slidable relatively thereto transversely of said frame, means for imparting such sliding movement to said table, a tire-truing tool carried by said table, and radius rod means having the opposite ends thereof pivotally connected to said first guide follower means and said table respectively and serving upon transverse movement of said table to cause said tool to traverse an arcuate path proximate to the tread of the tire.

2. A tire-truing machine as defined in claim 1, in which means are provided for adjusting the effective length of said radius rod means to thereby vary the relative spacing of said first guide follower means and said table longitudinally of said guide bar means and thus vary the radius of the arcuate path of movement of said tool.

3. A tire-truing machine as defined in claim 1, in which said tire-truing tool has a shiftable base for mounting it on said table and said radius rod means is formed with an extension past its pivotal connection with said table and said extension has a pivotal connection with said base for automatically adjusting the operative axis of said tool substantially normal to the arc defined by oscillation of said radius rod means.

4. A tire-truing machine as defined in claim 3, in which the base for said tire-truing tool is pivotally connected with said table.

5. A tire-truing machine as defined in claim 1, in which means are provided for centering the tire transversely of the supporting frame, said centering means including a centering gage carried by and guided for shifting movement longitudinally of said frame and provided in its tire confronting edge with a notch disposed in alignment with the longitudinal center of said frame, and the means for supporting the tire include a mandrel rotatably supported by said frame transversely thereof said mandrel being provided with means for the axial adjustment thereon of the tire transversely of the frame so that the periphery of the tire may be centered in the notch of the centering gage and hence in the longitudinal center of said frame when said gage is abutted against it.

6. A tire-truing machine, comprising a supporting frame, means carried adjacent to one end of said frame for axially rotatably supporting a tire, means for rotating said tire on its axis, a pair of relatively spaced parallel guide bars supported by said frame and extending longitudinally thereof, a first guide follower mounted on each of said guide bars adjacent to said tire supporting means, traveller means mounted on said frame in longitudinally spaced relation thereon with respect to said tire supporting means and rigidly connected with said first guide followers, means for adjusting said traveller means and with it said first guide followers longitudinally of said frame and for maintaining such adjustment, a second guide follower mounted on each of said guide bars and freely slidable thereon longitudinally of said frame, means defining a platform carried by said second guide followers and extending transversely of said frame, a table carried by said platform and slidable relatively thereto transversely of said frame, means for imparting such sliding movement to said table, a tire-truing tool carried by said table, and radius rods pivotally connected at their opposite ends to said first guide followers and to said table respectively and serving upon transverse movement of said table to cause said tool to traverse an arcuate path proximate to the tread of the tire.

7. A tire truing machine, comprising a supporting frame, traveller means mounted on said frame, means for adjusting said traveller means longitudinally of said frame and for maintaining such adjustment, a platform slidably mounted for longitudinal movement on said frame, a table carried by said platform and slidable relative thereto transversely of said frame, means for imparting such sliding movement to said table, a tire truing tool carried by and transversely movable with said table, radius rod means of adjustable effective length the ends of which are pivotally connected to said traveller means and to said table respectively, said radius rod means serving upon transverse movement of said table to impart a predetermined longitudinal reciprocative movement to the table to thereby cause said tool to traverse an arcuate path, and means carried by said frame for operatively locating with respect thereto the surface of a tire being trued.

References Cited in the file of this patent
UNITED STATES PATENTS

| | | |
|---|---|---|
| 2,167,017 | Wikle | July 25, 1939 |
| 2,200,575 | Kaskins | May 14, 1940 |
| 2,749,979 | Prewett | June 12, 1956 |
| 2,783,830 | Pozerycki et al. | Mar. 5, 1957 |
| 2,925,125 | Curry | Feb. 16, 1960 |